Feb. 17, 1942.　　　A. W. WENGER　　　2,273,741
APPARATUS FOR ATTACHING FERRULES TO FISHING RODS
Filed Jan. 22, 1940
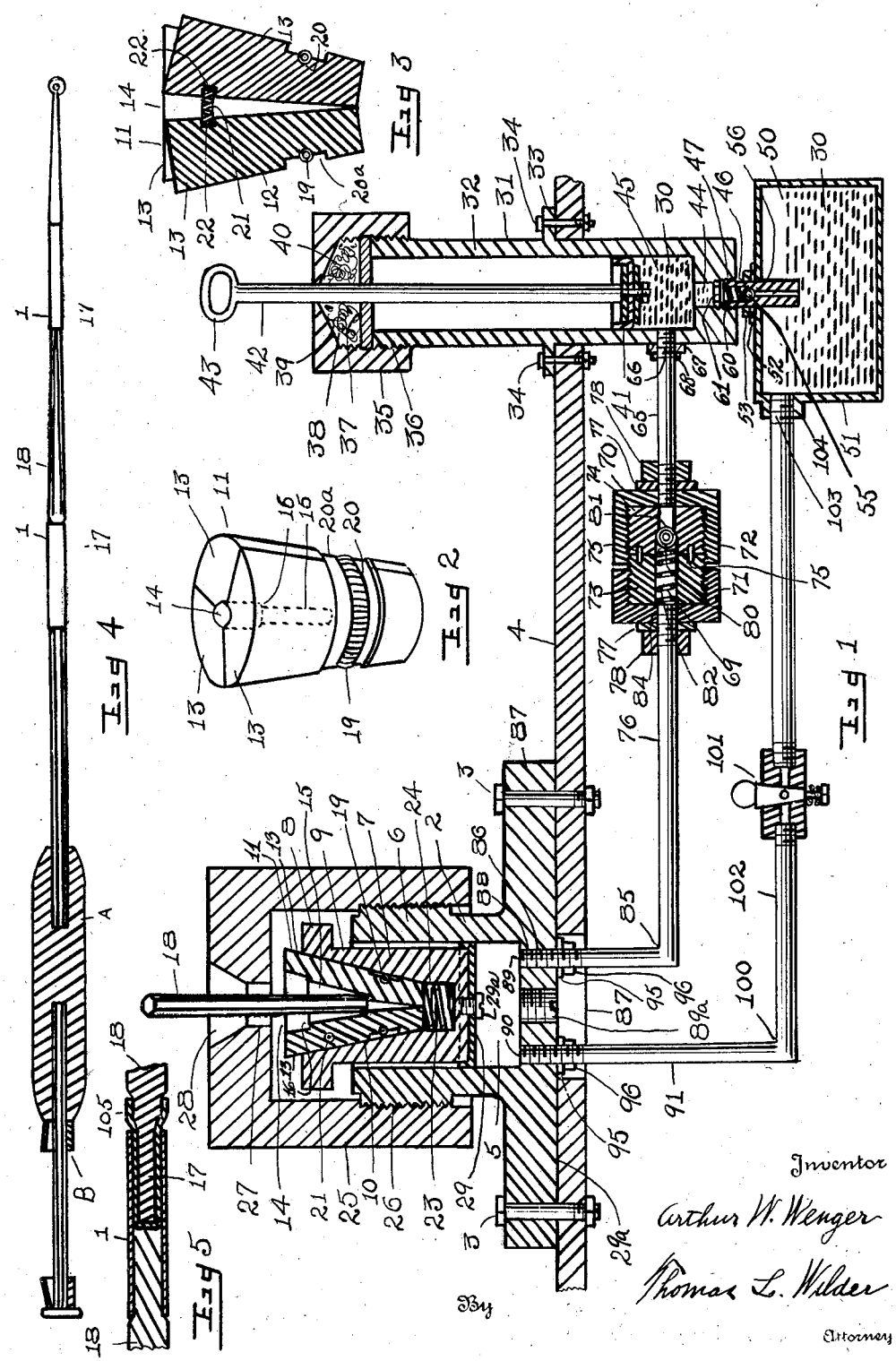

Patented Feb. 17, 1942

2,273,741

UNITED STATES PATENT OFFICE 2,273,741

APPARATUS FOR ATTACHING FERRULES TO FISHING RODS

Arthur W. Wenger, Utica, N. Y.

Application January 22, 1940, Serial No. 315,134

3 Claims. (Cl. 144—2)

My invention relates to a method and apparatus for attaching ferrules to fishing rods and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a method or machine for securing a metal ferrule to a fishing rod made of bamboo, plastics or other compressible materials by applying pressure to the bamboo, whereby to contract its diameter, mounting the ferrule on the compressed part and then allowing the bamboo to expand, whereby to effect a tight fit of the assembled parts.

In the construction of fishing rods made of bamboo and of interfitting sections certain metal ferrules are employed at the joints, whereby to hold the several sections together. Heretofore, the difficulty has been to effect a sufficiently tight fit of the metal ferrule with the bamboo to prevent said ferrule from working loose.

The method can be applied also to attaching the reel seats to the grip of the fishing rod.

It will be found useful, however, where any two or more parts are to be united together by compressing one part and inserting it into a corresponding hole of a complementary part and then allowing the compressed part to expand into the other, whereby to effect a tight joint.

The method or device embodies the use of dies or collets made of two or more interfitting sections which are compressed simultaneously around the bamboo to be diminished in diameter. The compressing force may be developed by hydraulic pressure applied to the collet.

Heretofore the method for attaching ferrules to fishing rods was to grind or cut the bamboo stock down to the required dimensions, whereby the ferrule could be driven thereon. This method of grinding is objectionable for the reason that it takes or removes the outer shell of the bamboo thereby destroying the best part thereof which has the real strength thereof. Furthermore, it also reduces the amount of bamboo stock inside of the ferrule, whereby any shrinkage of the bamboo results in a loose ferrule which is objectionable.

By the present method of compressing the bamboo or other stock used, the outer shell of the bamboo is not destroyed but merely compressed sufficiently to allow for sliding the ferrule in place thereon and then allowing the bamboo to expand into a rigid contact with the ferrule. In this method all the original bamboo stock is within the ferrule when it is mounted thereon. The bamboo rapidly expands after thus compressed, whereby to hold the ferrule tightly in position as aforestated. Furthermore any normal shrinkage of the bamboo is rapidly compensated for by the expanding stock of bamboo.

The object will be understood by referring to the drawing in which,

Fig. 1 is a central vertical section showing parts in full of the apparatus for compressing the bamboo to be attached to a ferrule of a fishing rod.

Fig. 2 is a detail view enlarged showing a perspective of a die employed.

Fig. 3 is a detail view enlarged showing a section of the die employed.

Fig. 4 is a sectional view of a fishing rod showing the ferrules with the bamboo therein in an assembled position.

Fig. 5 is a detail view somewhat enlarged showing a central vertical section of one of the joints of the fishing rod employing the construction of attaching the ferrule, parts being broken away.

Referring more particularly to the drawing, the method or apparatus for shrinking or compressing the bamboo, whereby it can be inserted in the metal ferrule 1 of the fishing rod or of the grip A to the reel seat B, employs a machine having a casing 2 bolted at 3 to table 4. It has an oil chamber 5 and an upstanding cylindrical portion 6 for housing the compressing member 7.

The compressing member 7 comprises a movable wedge 9 having an upper flange 8 with an inverted conical opening or aperture 10 for housing a die 11. The die 11 has an inverted conical surface 12 which cooperates with the interior surface of wedge 9 adjacent aperture 10, whereby to force die 11 into contact with the bamboo to compress the same.

Die 11 is made in three sectors 13, 13, 13 that cooperate with each other, whereby to compress the bamboo embraced therewithin. Said sectors 13, 13, 13, when united form a truncated cone.

Each of the sectors 13 has formed at its apex or central meeting point an arc shaped opening, which combine to effect a central annular opening 14. Opening 14 is diminished in diameter at 15 to form a shoulder at 16. The portion 17 of the bamboo rod 18 to be compressed is inserted in opening 14 of sectors 13 and the pressure applied as hereinafter described.

The means for holding the several sectors 13, 13 of die 11 yielding together contemplates a coiled spring 19 housed in an annular open recess 20 formed in each of sectors 13, 13, 13. The combined open recesses 20, 20, 20 provide a continuous open annular slot running completely around the peripheral surfaces of the sectors 13, 13, 13 of die 11, which sectors are countersunk at 20a, whereby the outer portion of spring 19 will clear surface 12 of die 11. The ends of springs 19 are fastened together by being welded or in any other suitable manner.

The means for separating the several sectors 13, 13, 13 to a limited degree after pressure is withdrawn, whereby to allow for the removal of the bamboo 18 and the insertion of a new piece thereof, embodies coiled springs 21, 21, 21 interposed between the contiguous meeting surfaces of said sectors 13, 13, 13. The respective ends of each of said springs 21 are housed in suitable aligned apertures 22, 22 made or countersunk in the contiguous meeting surfaces of sectors 13, 13, 13. Springs 21 are located above coiled spring 19 and are of sufficient strength as compared with spring 19 to push sectors 13, 13, 13 normally apart.

The means for lowering compressing member 7 relative to die 11 contemplates a coiled spring 23 resting at one end against the lower surface of the several sectors 13, 13, 13 of die 11 and at the other against the upper surface of wedge 9. An open recess 24 is made in the lower surface of wedge 9, whereby to house said spring 23.

A throat piece is threaded at 26 to upstanding cylindrical portion 3. Throat piece 25 has a centrally disposed aperture 27 for the admission of the bamboo 18 to die 11. A conical approach 28 is made to aperture 27, whereby to aid in guiding the bamboo into said aperture 27 and into aperture 14 directly below formed by sectors 13, 13, 13 of die 11.

A leather plunger or gasket 29 is fitted to the lower end of wedge 9, whereby to prevent the escape of the oil therepast. It is held in place by screw bolt 29a mounted in wedge 9.

The means for forcing oil or other liquid 30 into vat 5 under pressure to elevate wedge 9, whereby to compress the several sectors 13 of die 11 and bring them together embodies a pump 31, comprising a cylindrical casing 32 having an annular flange 33 disposed centrally over its longitudinal length. Flange 33 is bolted at 34 to the top surface of table 4. A cover or cap 35 is screw mounted to casing 32 at 36. A washer 37 closes the upper part of casing 32. Cap 35 has a chamber 38 with a conical upper wall at 39. Woolen or a like packing 40 is stuffed in chamber 38. It is forced toward piston rod 42 hereinafter mentioned, whereby to prevent leakage in that location.

A piston 41 is mounted to operate in casing 31. It is connected to a piston rod 42 which has a sliding fit in an aperture in cap 35 and washer 37. A handle 43 is formed integral to the upper end of piston rod 42.

The lower end of casing 31 has a passageway 44 for the inflow of oil to the chamber 45 of pump casing 31. A conduit pipe 46 is threaded at one end 47 to casing 31 and at the other it projects down into supply reservoir 50, whereby to allow for the passage of oil to chamber 45 of pump casing 31. The junction of pipe 46 with the casing 41 of reservoir 50 is hermetically sealed with a washer 52 and nut 53.

A one way ball valve 55 is disposed in pipe 46, whereby to allow the oil to enter the chamber of pump casing 31 but prevent it from returning to reservoir 50 by pipe 46. Ball valve 55 is held on its seat 56 formed in pipe 46 by a coiled spring 60 resting thereagainst at one end and at the other against pin 61 which is projected through pipe 46 and held with a tight fit therein.

The outlet from casing 31 is by way of pipe 65 threaded at 66 to the lower part of casing 31. A washer 67 and nut 68 mounted on the threaded portion of pipe 65 seals pipe 65 to casing 31. Pipe 65 leads into one way valve casing 70 comprising the cup shaped members 71 and 72 which are screw threaded to the filling members 73, 74 that are held together in contact with each other by pins 75, 75. Each of the filler members 73, 74 has a passageway 69 in alignment with each other and with pipe 65 for the flow of the oil. Pipe 65 is continued at the opposite side of valve casing 70 by pipe 76 which is in alignment therewith. Washers 77 and nuts 78 are employed to seal the junction of pipes 65 and 76 with members 71, 72.

A one way spring pressed ball valve 80 is mounted in passageway 69. It is held against seat 81 by coiled spring 82 which has one end resting against ball valve 80 and the other against the inner surface of cup shaped member 71 near the junction of pipe 76 with the contiguous surface of filler member 73.

Pipe 76 is screw threaded to the threads of cup shaped member 71 adjacent an aperture 84 therein. Pipe 76 is bent at right angles at 85. The end 86 is projected upward through an enlarged aperture 87 in table 4 and an aperture in base portion 87 of casing 2. It has a threaded connection at 88 in base portion 87 of casing 2. Passageway 89 opens into oil chamber 5. There is a drain plug 89a.

The outlet for the oil from chamber 5 is through passageway 90 to which the upper end of pipe 91 is screw threaded. Pipe 91 passes down through the enlarged aperture 87 in table 4.

Washers 95, 95 and nuts 96, 96 screw threaded to inlet pipe 76 and outlet pipe 91 are sealed hermetically against base 87 of casing 2, whereby to prevent leakage at that location.

Outlet pipe 91 is bent at right angles at 100. A valve cock 101 is disposed in the horizontal portion 102 of said pipe 91. The end 103 of pipe 91 is connected by screw threads to a boss 104 made in casing 51 of oil reservoir 50 in such manner that the oil from chamber 5 can be returned to said reservoir 50. The system of pipes 65, 76 and 91 provides for a complete circuit of the oil controlled by one way ball valve 80 and by the valve cock 101.

The operation of the device assuming valve cock 101 is closed, is effected by disposing the end of bamboo 18 which comprises one link or section of the fishing rod down through apertures 28 and 27 of throat piece 25 into the opening 14 of die 11 and then reciprocating pump piston 41 by means of handle 43, whereby to force the oil under pressure through pipe 65 past one way valve 80, pipe 76 into oil chamber 5. When the pressure in chamber 5 has reached a predetermined degree it will force both the movable compressing wedge 9 and the die 11 upward simultaneously until die 11 reaches the under surface of throat piece 25, whereupon die 11 will stop and movable compressing wedge 9 will continue to move upward against the tension of spring 23, whereby to urge the sectors 13, 13, 13 of die 11 against the cylindrical or lateral surface of bamboo 18 with sufficient force to compress the bamboo 18, whereby to conform it to the diameter of the ferrule 1.

After a predetermined interval of time valve cock 101 is opened, whereby to allow the oil to flow back into reservoir 50. Bamboo 18 is removed and a metal ferrule 1 pushed over the contracted portion 17 of bamboo 18. Within a comparatively short interval of time the bamboo 18 will swell into a permanently tight fit with the interior surface of ferrule 1.

On the next operation the oil in reservoir 50 will be sucked again up into chamber 44 of pump casing 31 past one way valve 55 and the above cycle of operations repeated.

The bamboo 18 is hexagonal in cross section. In assembling the fishing rod two ferrules are used. The female ferrule 1 mentioned above and also a male ferrule 105 which slides within the ferrule 1 as shown in Fig. 4.

Ring b slides on bamboo 18 to lock the reel in position, not shown.

Having thus described my invention what I claim as new and desire to secure by Letters Patent is as follows:

1. In a machine for reducing a fishing rod, a casing, a die member within said casing, said die member made in sectors forming a truncated cone, said sectors effecting an opening which is reduced in size to form a shoulder, springs located between said sectors for holding said sectors normally separated, a compressing member having a conical opening and disposed within said casing and cooperating with said die member, hydraulic pressure to force said compressing member against said die member and another spring in said compressing member and contacting said die member for forcing said wedge shaped member away from said die member when the pressure is released.

2. In a machine for reducing a fishing rod, a casing, a die member within said casing, said die member made in sectors forming a truncated cone, said sectors effecting an annular opening which is reduced in size to form a shoulder, springs located between said sectors for holding said sectors normally separated, an annular slot formed in said sectors, a spring mounted in said slot for holding said sectors together, a compressing member having a conical opening and disposed within said casing and cooperating with said die member, hydraulic pressure to force said compressing member against said die member, another spring mounted in said compressing member and contacting said die member for separating said compressing member from said die member when the pressure is released.

3. In a machine for reducing a fishing rod, a casing, a die member within said casing, said die member being made in sectors forming a truncated cone, said sectors effecting an annular opening in the center thereof which is reduced in size to form a shoulder and restricted portion, springs located between said sectors for holding said sectors normally apart, an annular slot formed in the outside surface of said sectors, a spring mounted in said slot for holding said sectors together in a yielding manner, a compressing member mounted within said casing and having a conical opening, said compressing member cooperating with said die member, hydraulic pressure to force said compressing member against said die member, another spring mounted in said compressing member and contacting said die member for separating said compressing member from said die member when the pressure is released.

ARTHUR W. WENGER.